United States Patent
Phelps

(10) Patent No.: US 7,635,334 B2
(45) Date of Patent: Dec. 22, 2009

(54) DYNAMIC SUB-ARRAY MAPPING SYSTEMS AND METHODS FOR ULTRASOUND IMAGING

(75) Inventor: Robert N. Phelps, Fall City, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1006 days.

(21) Appl. No.: 10/834,779

(22) Filed: Apr. 28, 2004

(65) Prior Publication Data

US 2005/0243812 A1 Nov. 3, 2005

(51) Int. Cl.
 *A61B 8/00* (2006.01)
(52) U.S. Cl. .................. 600/447; 600/472; 600/459
(58) Field of Classification Search ................. 600/443, 600/447
See application file for complete search history.

(56) References Cited

U.S. PATENT DOCUMENTS

| | | | | |
|---|---|---|---|---|
| 4,127,034 A * | 11/1978 | Lederman et al. | ............. | 73/626 |
| 4,662,223 A * | 5/1987 | Riley et al. | ............. | 73/626 |
| 5,027,659 A * | 7/1991 | Bele et al. | ............. | 73/626 |
| 5,186,175 A * | 2/1993 | Hirama et al. | ............. | 600/447 |
| 6,089,096 A * | 7/2000 | Alexandru | ............. | 73/626 |
| 6,128,958 A * | 10/2000 | Cain | ............. | 73/626 |
| 6,183,419 B1 * | 2/2001 | Wildes | ............. | 600/447 |
| 6,254,542 B1 * | 7/2001 | Hamilton et al. | ............. | 600/447 |
| 6,375,617 B1 * | 4/2002 | Fraser | ............. | 600/443 |
| 6,676,602 B1 * | 1/2004 | Barnes et al. | ............. | 600/443 |
| 7,090,642 B2 * | 8/2006 | Satoh | ............. | 600/447 |
| 7,322,936 B2 * | 1/2008 | Takeuchi | ............. | 600/447 |
| 2005/0033179 A1 | 2/2005 | Gardner et al. | | |
| 2005/0148873 A1 | 7/2005 | Petersen et al. | | |
| 2005/0192499 A1 | 9/2005 | Lazenby et al. | | |
| 2005/0203391 A1 | 9/2005 | Phelps et al. | | |
| 2005/0203392 A1 | 9/2005 | Peteresen et al. | | |
| 2005/0228277 A1 | 10/2005 | Barnes et al. | | |

OTHER PUBLICATIONS

Thompson, Daniel M. Understanding Audio: Getting the Most Out of Your Project or Professional Recording Studio. Hal Leonard Corporation, 2005 [ISBN 0634009591, 9780634009594].*

* cited by examiner

*Primary Examiner*—Eric F Winakur
*Assistant Examiner*—Helene Bor

(57) ABSTRACT

Elements within each of a plurality of sub-arrays are dynamically grouped as a function of the steering direction. The dynamic grouping allows for partial beamforming with more similar delays within each grouping of elements within the sub-array. A plurality of partial beamformers is provided for each sub-array. Different ones of the elements are mapped to different ones of the partial beamformers as a function of the steering direction. As used herein, steering direction includes one or more of a focal location, a scan line angle, a scan line origin or other beamforming parameters associated with establishing a relative delay between elements. The shape or grouping of elements is changed at the beginning of any acquisition cycle, such as the beginning of transmit and receive operation for a given steering direction. Dynamic sub-array mapping may minimize negative effects of sub-array partial beamforming by providing an optimal shape of the sub-array groupings based on the steering direction.

24 Claims, 2 Drawing Sheets

DYNAMIC SUB-ARRAY MAPPING SYSTEMS AND METHODS FOR ULTRASOUND IMAGING

BACKGROUND

The present invention relates to ultrasound imaging with sub-arrays. In particular, combining data in different sub-arrays is provided.

Ultrasound imaging systems typically have a limited number of transmit and receive beamformer channels, such as 128, 192 or 256 channels. Multi-dimensional transducer arrays have hundreds or thousands of transducer elements, creating a mismatch of the number of elements to the number of transducer channels. To match the transducer to the beamformers, sub-arrays are defined on the transducer array. The physical size of the array or number of elements and the number of channels determines the number of elements included within each sub-array. A larger number of elements included in the sub-array requires a fewer number of cables and beamformer channels.

To make use of the signals from each of the elements within a sub-array, the signals are combined. For example, partial beamforming is applied to form a single output for each sub-array. Relative delays are applied to the signals from the elements within the sub-array as a function of the steering direction and/or focal depth. The relatively delayed signals are then summed to form a common output. The process is referred to as partial beamforming since only a portion of the array is beamformed for output to the imaging system. Final beamforming is across the array as a function of the different partially beamformed sub-array signals. The amount of relative delay applied to different elements within a sub aperture is determined by the differential in time of flight to a focal location from each of the elements within the sub-array. A greater range of time of flight, leads to a greater difference in delay. A greater difference, such as due to a larger sub-array size, may introduce errors in application of the delays, increased cost or increased complexity in the circuitry used to implement the partial beamformation.

In another approach for reducing the number of signals from an array to match the number of system channels, U.S. Pat. No. 6,676,602, the disclosure of which is incorporated herein by reference, switchably connects different elements across the entire array associated with a same delay. For different steering directions, different groups of elements are associated with a same delay. The shape of the element groups changes based on the steering without any predefined sub-arrays. The signals from elements associated with a same delay are summed together, such as using a summing node or mere connection of conductors and provided to individual channels of the beamformers.

BRIEF SUMMARY

By way of introduction, the preferred embodiments described below include methods and systems for dynamically grouping elements within each of a plurality of sub-arrays as a function of the steering direction. The dynamic grouping allows for partial beamforming with more similar delays within each grouping of elements within the sub-array. A plurality of partial beamformers is provided for each sub-array. Different ones of the elements are mapped to different ones of the partial beamformers as a function of the steering direction. As used herein, steering direction includes one or more of a focal location, a scan line angle, a scan line origin or other parameters associated with establishing a relative delay between elements. The shape or grouping of elements is changed at the beginning of any acquisition cycle, such as the beginning of transmit and receive operation for a given steering direction. Dynamic sub-array mapping may minimize negative effects of sub-array partial beamforming by providing an optimal shape of the sub-array groupings based on the steering direction.

In a first aspect, a method for dynamic sub-array mapping in ultrasound beamformation is provided. Elements of a first sub-array of an array are grouped into at least first and second groups as a function of a steering direction. Signals are received from the elements of the first group. Different relative delays or different relative phases are applied to the signals within the group. After applying the delays or phase shifts, the signals within the group are combined.

In a second aspect, a method is provided for dynamic sub-array mapping in ultrasound beamformation. Elements of a first sub-array of an array are grouped into at least two groups as a function of a steering direction. Pulsed wave signals are received from the elements of each of the two groups. The pulse wave signals from the first group of elements are combined. The pulse wave groups from the second group of elements are combined separately from the combination of the signals from the first group.

In a third aspect, a system is provided for dynamic sub-array mapping in ultrasound beamformation. A plurality of switches is operable to group elements of a sub-array of an array into different groups as a function of the steering direction. One group is connected with one partial beamformer and a different group is connected with a different partial beamformer. The partial beamformers are operable to apply different relative delays, relative phase shifts or combinations thereof to signals from the elements within the respective group and operable to combine the signals from elements within the respective groups.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
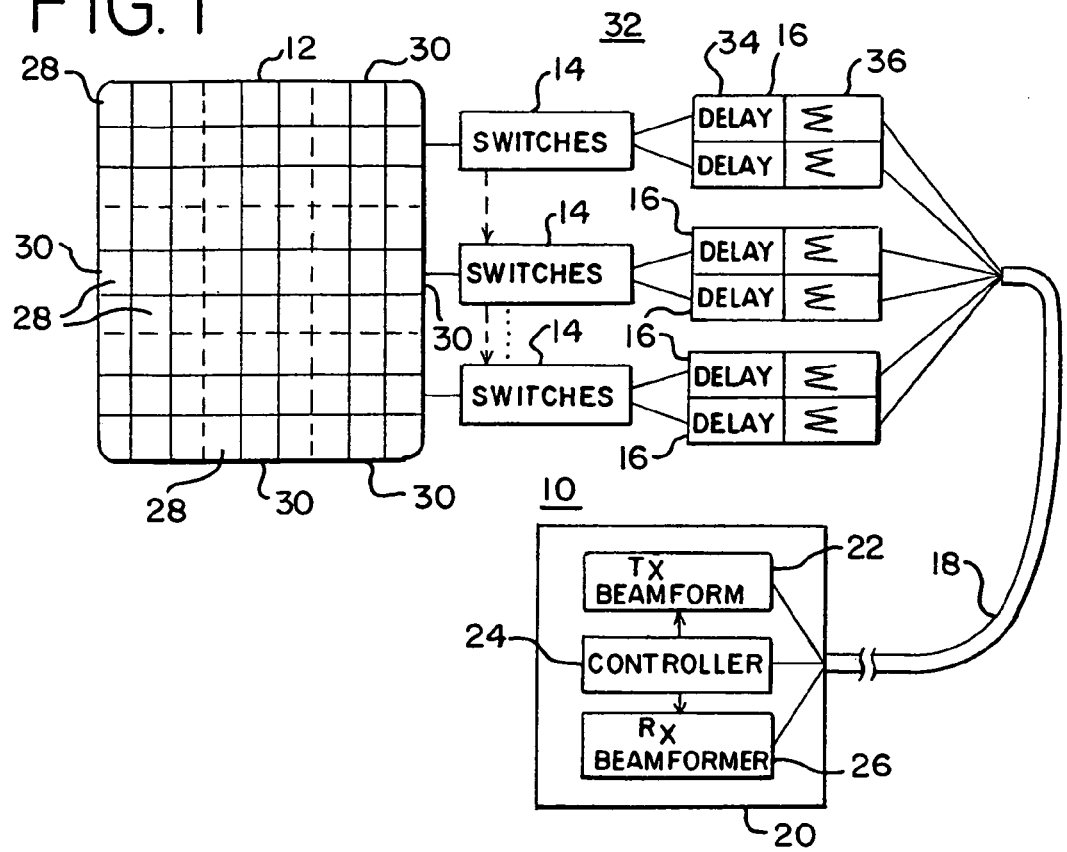
FIG. 1 is a block diagram of one embodiment of a system for dynamic sub-array mapping in ultrasound beamformation.
Figure 2:
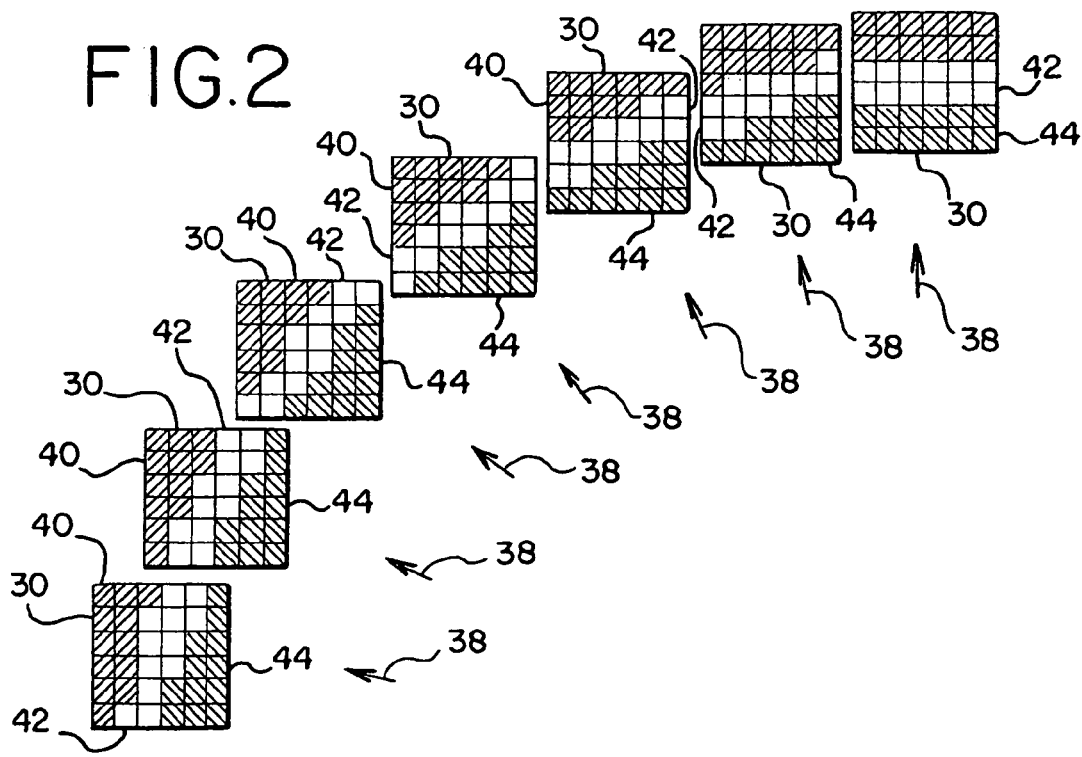
FIG. 2 is a graphical representation of different groupings of elements within a sub-array as a function of steering direction in one embodiment.
Figure 3:
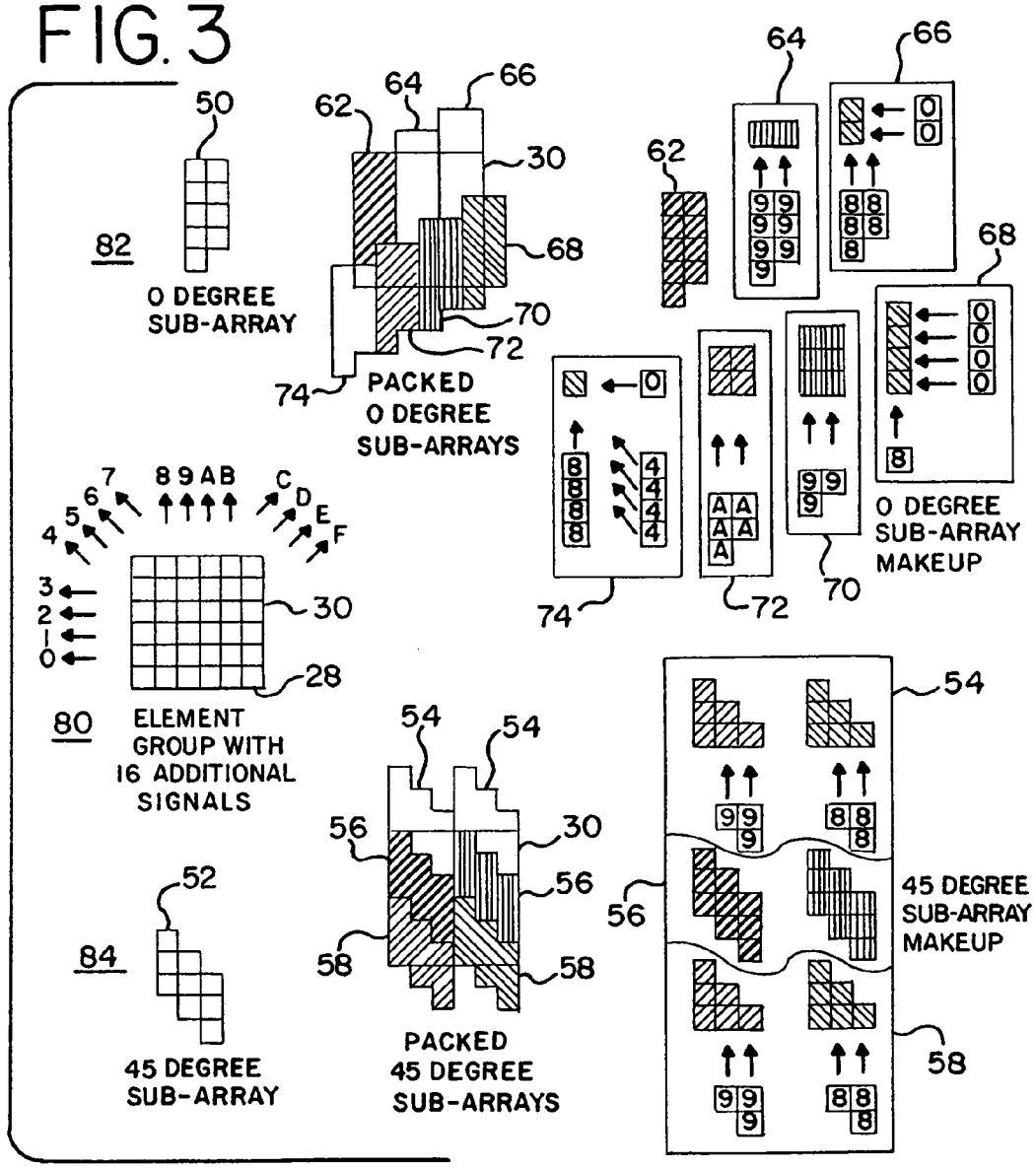
FIG. 3 is a graphical representation of another embodiment of the grouping of elements within a sub-array and adjacent sub-arrays as a function of steering direction.

FIG. 1 shows a system 10 for dynamic sub-array mapping in ultrasound beamformation. FIG. 2 shows one embodiment of a scheme for distributing groups of elements within a sub-array. The groupings of elements correspond to different or a plurality of partial beamformers. FIG. 3 represents groupings including elements from adjacent sub-arrays in connections to different partial beamformers to group elements as a function of the steering direction. While described with respect to partial beamforming, other combinations of signals from different element groupings may be used, such as time division multiplexing, sub-array mixing (e.g., mixing a relatively phased local oscillation signal with the signals from the different elements) or other now known or later developed devices and processes for combining signals from multiple elements onto to a single output.

The system 10 of FIG. 1 includes an array 12 of elements 28, switches 14, partial beamformers 16, and a transducer cable 18 as part of a transducer assembly 32. The system 10 also includes an ultrasound imaging system 20 with a transmit beamformer 22, a controller 24 and a receive beamformer 26. Additional, different or fewer components may be provided. For example, a multilayer switch structure is provided, a controller is provided as part of the transducer assembly 32, the switches 14 or partial beamformers 16 are spaced from the transducer array 12 (e.g., such as spaced within an imaging system), multiplexers are provided instead of the partial beamformer 16, and/or the switches 14 are provided as integrated within or on the array 12.

The array 12 of elements 28 is a multi-dimensional array, such as a two-dimensional array as shown, a rectangular array, hexagonal array, a triangular array or other now known or later developed arrays. The array 12 includes elements 28 fully or sparsely sampled along any of various grid patterns, such as rectangular, hexagonal, triangular or other patterns. Irregular array shapes or one-dimensional arrays may alternatively be used.

The elements 28 are PZT, capacitive membrane, electrostatic or other now known or later developed structures for transducing between electrical and acoustical energies. Solid PZT, ceramic or a composite of epoxy and ceramic may be used. Each of the elements 28 is separated from other elements 28 by a kerf, epoxy, air or other physical separation. The solid lines and dashed lines on the array 12 represent separation of the different elements 28. In alternative embodiments, the elements 28 are separated by electrode patterning but have a common physical structure without kerfs.

The partial beamformers 16 each include a plurality of delays 34 and one or more summers 36. The delays 34 may be a tapped delay line or a switched-capacitive filter delay. Alternatively, other analog delays or digital delays using a clock and buffer structure are provided. In yet other alternative embodiments, the delays 34 are phase rotators, such as a multiplier, analog circuit or digital circuit for shifting a phase of a signal to approximate a delay. Separate delays 34 are provided for each of the elements 28 connected with the partial beamformer 16. Alternatively, the number of delays 34 is a subset of the number of elements 28 connected with the partial beamformer 16 at any given time.

The summer 36 is a common node, digital summer, analog summer, amplifier or other now known or later developed summing device. The summer 36 connects with each of the delays 34 within a partial beamformer 16. The connection is either direct or indirect, such as one summer connecting with each delay 34 through a plurality of other summers. For example, the summer 36 is a single summer for summing the output from each of the delays 34 to form a common output signal. In alternative embodiments, the summer 36 includes a plurality of summers operable to sum signals together in various combinations to output a single output.

A plurality of partial beamformers 16 connects with a given sub-array 30 of the array 12. The sub-arrays 30 are represented by the dashed lines on the array 12 in FIG. 1. As shown, nine sub-arrays are defined. In alternative embodiments, additional or fewer sub-arrays are used. The sub-arrays 30 each include nine elements 28 as shown in FIG. 1, but a greater or less number of elements 28 may be provided within a given sub-array 30. Different sub-arrays 30 may have different numbers of elements 28. The sub-arrays 30 are defined through control structure, such as software, or through hardware connections, such as shown in FIG. 1 with different groups of switches 14 connected with different sub-arrays 30. Different partial beamformers 16 connect with different switches 14, associating different partial beamformers 16 with different sub-arrays 30.

As shown in FIG. 1, two partial beamformers 16 are provided for each of the sub-arrays 30. Additional or fewer partial beamformers 16 may be used for a given sub-array 30. The partial beamformers 16 are connectable with the array 30 through the switches 14 or may include permanent connections. The partial beamformers 16 are operable to apply different relative delay, relative phase shifts or combinations thereof to signals from elements 28 within respective groupings in a given sub-array 30 and combine the signals from the elements within the respective grouping. Different partial beamformers 16 provide this operation for different sub-arrays 30. In one embodiment, the additional partial beamformers 16 for other sub-arrays are free of connection with elements 28 of a different sub-array 30. For example, the hardware associated with the partial beamformers 16 is incapable of connection with other sub-arrays 30, providing N partial beamformers dedicated to a particular sub-array 30. Other partial beamformers 16 are dedicated to other sub-arrays. Alternatively, a partial beamformer 16 connects with elements 28 from other sub-arrays 30. The partial beamformers 16 are connectable to more than one sub-array 30 but are not connected to more than one subarray during use. In an alternative embodiment, the partial beamformer 16 is connectable with elements 28 of more than one sub-array 30 during use, such as represented by the dashed line connecting different groups of switches 14.

The switches 14 are transistors, relays, microelectromechanical devices, multiplexers or other now known or later developed switching devices. The switches 14 are a network of switches or plurality of switches for selectively connecting different elements 28 of a given sub-array 30 to different partial beamformers 16. Each plurality of switches 14 is a one to N router operable to connect any one of the elements 28 of a sub-array 30 with any one of the N partial beamformers 16. Different pluralities of switches 14 connect different partial beamformers 16 to different sub-arrays 30. In one embodiment, a layered network of switches 14 is provided, but a single layer switch network may be used. The switches 14 are separate from the array 12 as shown, but may be integrated on a same substrate as the array 12 or formed on the face of the array 12.

A given plurality of switches 14 is operable to group elements 28 of a given sub-array 30 of the array 12 into at least two groups as a function of the steering direction. The different groups of elements 28 formed by the switches 14 within a given sub-array 30 are connected with different partial beamformers 16 for the sub-array 30. Different sub-arrays 30 are associated with a same or different grouping of elements 28 for connection to respective partial beamformers 16. In one embodiment, the array 12 is a multi-dimensional array, the sub-arrays 30 are multi-dimensional arrays, and the groups of elements 28 formed within each sub-array 30 are multi-dimensional groupings of elements 28, such as groupings of K×L elements 28 where both K and L are greater than one.

FIG. 2 shows different groupings of elements 28 for a given sub-array as a function of the steering direction 38. The steering direction 38 is represented as the vector component for a given scan line within the plane of the sub-array 30. A point associated with an orthogonal steering direction may be provided in alternative embodiments. The elements 28 are grouped into three groupings 40, 42 and 44. A same or different number of elements 28 is provided within each grouping 40, 42 and 44. For different steering directions 38, different groupings 40, 42 and 44 of elements 28 are provided, such as a given element 28 being within any of the three groupings 40, 42, 44 as a function of different steering directions 38. Each element 28 within a sub-array 30 is included in only one grouping 40, 42, 44, but may be included in multiple groupings at a given time. The number of groupings 40, 42, 44 used corresponds to the number of partial beamformers 16 for a given sub-array 30. The number of elements 28 within a given grouping 40, 42, 44 corresponds to the number of channels of the partial beamformer 16, but the partial beamformer 16 may have additional channels or signals from one or more elements 28 may be combined with other signals prior to partial beamforming. The groupings 40, 42, 44 are selected as elements 28 having similar relative delays, such as forming groupings generally orthogonal or perpendicular to the steering direction vector component on the face of the sub-array 30. For an orthogonal steering 38 direction to the face of the array 12, the groupings may correspond to generally concentric rings of any shape. Different sizes, number of groupings 40, 42, 44, number of elements 28 within a grouping 40, 42, 44, shapes of groupings 40, 42, 44 or other grouping characteristics may be used. While each of the groups 40, 42, 44 has a same number of elements as 28 shown in FIG. 2, different groups may have different numbers of elements 28. Non-contiguous groupings of elements 28 may also be used. As shown in FIG. 2, seven different, possible sub-array groupings 40, 42 and 44 are shown for seven different steering directions 38. For steering directions 38 in between the directions shown, a nearest steering direction grouping may be used. Alternatively, smaller steering direction steps sized for selecting different groupings is provided. For steering directions other than the angles shown, different groupings may be provided, such as extrapolating for 28 different steering or focusing sectors over 360 degrees. A greater number of elements 28 within an element group may provide for more flexibility for sub-array shapes.

FIG. 2 represents a single sub-array 30 configured in response to different steering directions 38, such as configured at different times within a scan process. Other sub-arrays 30 of the array 12 have similar or different groupings as a function of the sub-array's position relative to the steering direction. In one embodiment where the steering direction or focal position is outside the bounds of the array 12, two or more of the sub-arrays 30 may have a same configuration using the different associated switches 14 and partial beamformers 16. As an example of different configurations, a focal point orthogonal to the center of the array 12 may result in different sub-arrays 30 having different configurations as a function of the position of the sub-array 30 relative to the center of the array 12.

FIG. 3 graphically represents forming element groups using elements 28 from adjacent sub-arrays 30. The switches 14 include additional switches for connecting different elements 28 from one sub-array 30 with partial beamformers 16 for an adjacent sub-array 30. As shown in FIG. 3, the switches 14 provide for four different groupings of elements associated with four partial beamformers 16 for the given sub-array 30. Additional switches or associated routers represented by the dashed lines between the switches 14 in FIG. 1 and the numerically and alphabetically labeled arrows shown in FIG. 3 route element signals of one or more elements to element groups of a neighboring or adjacent sub-array. For any given element 28 of a sub-array 30, the element may be mapped to a partial beamformer 16 for that sub-array or one or more adjacent sub-arrays 30. A given partial beamformer 16 may include elements from a sub-array 30 as well as elements from one or more adjacent sub-arrays. FIG. 3 shows at 80 a sub-array 30 of elements 28 with switchable connections to four adjacent sub-arrays with four outputs per adjacent sub-array (e.g., labeled 0-3, 4-7, 8-B, and C-F). Additional outputs from one sub-array 30 to an adjacent sub-array 30 may be provided. For a given sub-array 30, inputs from other adjacent sub-arrays, such as sub-arrays 30 adjacent at different positions than associated with the outputs are provided. In alternative embodiments, outputs and inputs are provided from between two same sub-arrays 30. The switching or outputs are provided by current summing nodes or voltage outputs with operational amplifiers. For current summing nodes, several outputs from devices (e.g., delays) can be connected and then one wire goes down the cable to the system. The contributions sum without additional components. Each current path to the system is connected to several device outputs each capable of routing signals from elements. Every element 28 could have N outputs where N is the number of system channels, but a fewer number of outputs are provided based on the use of sub-arrays.

A sub-array associated with a 0 degree steering direction is generally shown as sub-array 50 at label 82. Seven repeating groupings of elements 62-74 are shown where at least one element of the sub-array 30 is included in each of the groupings. In this example, grouping 62 is formed entirely of elements 28 within the sub-array 30 using a partial beamformer associated with the sub-array 30. Element grouping 64 has seven elements within the sub-array 30 connected on output lines to an adjacent sub-array for use with a partial beamformer provided for the adjacent sub-array. Similarly, groupings 66 and 74 have elements that are output to partial beamformers associated with adjacent sub-arrays 30. Four partial beamformers associated with the sub-array 30 connect with the element groupings 62, 68, 70 and 72, respectively. The elements of the group 68 are from three different sub-arrays. The elements associated with group 74 are from four different sub-arrays. A combination of sub-array outputs and inputs to a sub-array are used to form each group.

As another example, sub-arrays 52 associated with a 45 degree steering direction are generally labeled at 84. A given sub-array 30 includes elements 28 for six different groupings of elements. The groupings of elements shown are labeled in pairs, such as groupings 54, 56 and 58. The groupings 54 are formed by outputting signals from three different elements to partial beamformers associated with an adjacent sub-array 30. All of the elements within the groupings 56 are within the sub-array 30. The groupings 58 include elements from an adjacent sub-array 30. Using four partial beamformers for the sub-array 30 shown, the groups of elements 56 and 58 are partially beamformed.

While 0 degree and 45 degree sub-arrays are shown, other steering direction sub-arrays may be used with the same or different shapes or groupings of elements. As shown, each grouping of elements is a same size and shape for a given steering direction, but different sizes or shapes may be used across a sub-array 30. Each group includes nine elements as shown, but may include additional or fewer elements. Different groups may have different numbers of elements. Using a rectangular grid, the rotation scheme between 0 and 45 degrees may be extrapolated to six other different groupings as a function of different steering angles. A greater or fewer number of steering angle groupings may be used. Depending on the location of the focal point, or scan line origin, the shape of a given grouping may be the same or different than the shape of an adjacent groupings of elements.

The partially beamformed outputs are provided through the cable 18, such as a plurality of coaxial cables, to the imaging system 20. The imaging system 20 is a medical diagnostic ultrasound imaging system. Any now known or later developed imaging system may be used, such as cart mounted, hand held, portable, permanent or other ultrasound systems.

The imaging system includes one or both of a transmit beamformer 22 and a receive beamformer 26. The transmit beamformer 22 includes a plurality of pulsers, waveform generators, digital-to-analog converters, delays, phase rotators, amplifiers or other now known or later developed components in a plurality of channels. The plurality of channels corresponds to the plurality of sub-arrays 30. Similarly, the receive beamformer 26 includes amplifiers, delays, phase rotators, filters, summers, or other now known or later developed receive beamformer components. The receive beamformer components are formed into a plurality of channels for applying relative delays and apodization. The signals from each of the partial beamformers 16 are provided to separate receive beamformer channels. The receive beamformer 26 applies relative to the delays or phase shifts and apodization for focusing the partially beamformed signals. The relatively delayed and apodized signals are then summed to form a signal representing a particular spatial location along the steering direction. The partial beamformation in combination with the beamformation provided by the imaging system focuses the signals from each different element 28 to a particular focal location. Since fewer partial beamformers 16 are provided than elements for each sub-array, a fewer number of outputs, associated coaxial cables 18 and receive beamformer channels are used for forming beams from data from a larger number of elements 28 of the array 12.

The controller 24 is an application specific integrated circuit, control processor, general processor, digital signal processor, analog circuit, digital circuit, combinations thereof or other now known or later developed control device. While shown as part of the imaging system, a portion or the entire controller 24 may be positioned within the transducer probe assembly 32, such as adjacent to the array 12 in a hand held probe. Where at least a portion of the controller 24 is provided in the imaging system 20, one or more coaxial cables or other signal conductors are provided within the cable 18 for controlling the partial beamformer 16 and/or the switches 14. The controller 24 is operable to reconfigure the switches 14 as a function of different steering directions. The controller 24 is also operable to configure the transmit beamformer 22, receive beamformer 26, partial beamformers 16 or combinations thereof as a function of different steering directions. By controlling the switches 14 to establish different groupings for different steering directions, at least one element in one group for one steering direction may be in a different group for a different steering direction.

The transducer assembly 32 has the array 12, the switches 14 and the partial beamformer 16 within a probe housing, such as a hand held housing, and connects the components through the cable 18 to the imaging system 20. The transducer assembly 32 is detachably connected in one embodiment, but may be permanently connected in other embodiments. Partial beamforming in the transducer assembly 32 and the imaging system 20 may be used. For example, a connector of the transducer assembly 32 includes the partial beamformer 16 or other electrical components of the transducer assembly 32, such as disclosed in application Ser. Nos. 10/741,827 and 10/741,538, the disclosures of which are incorporated herein by reference. The switching network, partial beamforming or combination of data from a plurality of elements disclosed in the above-referenced patents or application Ser. Nos. 10/788,021 and 10/788,103, the disclosures of which are incorporated herein by reference, may be used. For example, a switching structure is provided for implementing relative phase shifts as part of partial beamforming. As another example, the switching structure associated with forming sub-arrays out of hardware components that connect with elements across multiple sub-arrays is provided. Different sub-array sizes are then selected as a function of the number of receive beamformer channels. The number of partial beamformers associated with each sub-array may then vary as a function of the selected sub-array size.

Figure 4:
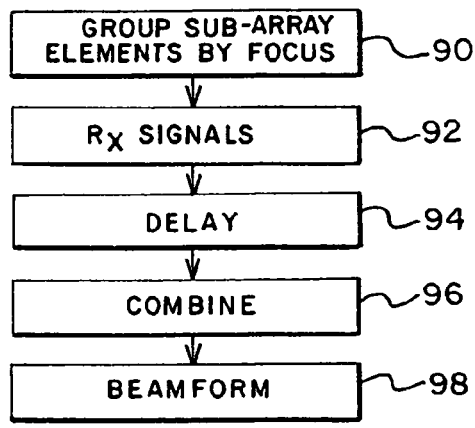
FIG. 4 is a flowchart diagram of one embodiment of a method for dynamic sub-array mapping in ultrasound beamformation.

FIG. 4 shows one embodiment of a method for dynamic sub-array mapping in ultrasound beamformation. Additional, different or fewer acts may be provided in the same or different order. The method shown in FIG. 4 is implemented using the system 10 of FIG. 1 or a different system.

In act 90, elements of a sub-array of an array are grouped into at least two groups as a function of the steering direction. For example, each group of elements is multi-dimensional, having an extent greater than one element along at least two dimensions, within a multi-dimensional sub-array of a multi-dimensional array. Alternatively, one or more of the groups is one dimensional. In yet another alternative, one or more sub-arrays are one dimensional. Similar groupings are provided for each of a plurality of sub-arrays within an array at a given time. The groupings are different for different steering directions. For example, each of the elements included within a group have similar delays or phase rotations. The different phase rotations or delays associated with elements of the sub-array are divided into two or more groups covering different parts of the range of delays or phase shifts. The steering direction determines the range or phase shifts based on time of flight to a focal point.

In one embodiment, each group of elements for each of a plurality of sub-arrays is formed out of elements within the respective sub-array alone. Each group of elements is free of groupings crossing between or over two or more sub-arrays. In an alternative embodiment, one or more groups of a given sub-array or a plurality of different sub-arrays include at least one element from an adjacent sub-array. A given grouping of elements may include multiple elements from one or multiple adjacent sub-arrays. The groupings are selected as a function of the steering direction. In additional embodiments, further parameters are used to select elements in addition to steering direction, such as hardware switching limitations, number of transducer cables, number of partial beamformers, number of receive beamformer channels or other considerations.

In one embodiment, the selection of groups is used for transmit operation, such as applying a generated transmit waveform from a transmit beamformer channel to each group of elements and providing further delays or adjustments of phase of the transmit waveform within a grouping of elements for transmit purposes. In an additional or alternative embodiment shown in act 92, signals from the elements within each group of elements are received. For example, pulsed signals from pulsed transmissions, such as transmissions of 1-5 cycles, are received. Signals received by each element are the same or different. Transmission and reception of pulsed waveforms may allow for scanning a multi-dimensional region of a patient. In alternative embodiments, a continuous waveform is transmitted and received using different transmit and receive elements. In one embodiment, act 90 is performed before act 92. Alternatively, act 92 is performed before act 90. The received signals are amplified. Switching is provided after or before amplification.

In act 94, one of different relative delays, different relative phase shifts or combination of thereof is applied to the signals within each group. The delays or phase shifts are applied to signals of one element within the group relative to other elements within the group. Amplification or relative apodization may also be applied. The delays or phase shifts are selected as appropriate for partially beamforming the signals from elements within a group. In alternative embodiments, sub-array mixing or time division multiplexing is provided for the elements within the group.

In act 96, signals within the group after application of delays or relative phase shifts are combined. Combination forms a partial beam based on signals received from elements within the group. For example, pulse waved signals that are relatively delayed and apodized from within the group of elements are summed. The partial beamforming output provides a single signal or data stream for a later complete beamforming across the array. In alternative embodiments, the combination of data is provided through time division multiplexing, sub-array mixing or other now known or later developed processes for combining signals from multiple sources to a single stream of data or signals. Digital or analog partial beamforming may be used.

The grouping of act 90, the reception of signals of act 92, the application of relative delays or phase shifts of act 94 and the combination of act 96 for each group of elements is performed in any possible order at a same or a substantially same time for each of the sub-arrays of an array. Substantially at the same time is used to account for differences in time due to a selected steering direction or focal point location. For each sub-array, one, two or more groups of elements are formed and partially beamformed by applying different relative delays and combining the signals within the group. For a given sub-array, one, two or more output streams of data associated with different groups of elements for the sub-array are provided. Where a group of elements includes elements from multiple adjacent sub-arrays, the partially beamformed output signal represents the group of elements from multiple sub-arrays. The additional elements from an adjacent sub-array are included within the group as a function of the steering direction.

In one embodiment, the combination of signals within a same group is performed within a transducer assembly separate from an imaging system. Power is provided from a battery or from the imaging system for scanning in three dimensions with a multi-dimensional array. The separate partial beamforming for each group of elements reduces the number of signal connections directly provided or multiplexed together and provided to different receive beamformer channels. In alternative embodiments, the partial beamformation is provided within an imaging system spaced away from the transducer array. For final receive beamformation, the partially beamformed signals from different groups of elements are relatively phased or delayed, apodized and then summed together. The combination through summing with relative delays or phase shifts provides for beamforming the combined signals from different groups. In one embodiment, the beamforming is performed at an imaging system, but may alternatively be performed within a transducer assembly.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for dynamic sub-array mapping in ultrasound beamformation, the method comprising:
    (a) for reception of ultrasound, grouping elements of a first sub-array of an array into at least first and second groups as a function of a first steering direction, the grouping of elements being different for different steering directions such that different ones of the elements are in the first sub-array for the different steering directions, wherein the grouping is done via a plurality of switches coupled to said first sub-array;
    (b) receiving signals from the elements of the first group;
    (c) applying one of different relative delays, different relative phase shifts or combinations thereof to the signals within the first group;
    (d) combining the signals within the first group after (c).

2. The method of claim 1 wherein (a) is performed differently for each of a plurality of the different steering directions, at least one element being in the first group for the first steering direction and in the second group for a second steering direction.

3. The method of claim 1 further comprising:
    (e) performing (a), (b), (c) and (d) separately for each of a plurality of sub-arrays of the array at a substantially same time, the first sub-array of (a) being one of the plurality of sub-arrays.

4. The method of claim 1 further comprising:
    (e) receiving signals from the elements of the second group;
    (f) applying at least one of different relative delays or different relative phase shifts to the signals within the second group;
    (g) combining the signals within the second group after (f).

5. The method of claim 1 further comprising:
    (e) performing (d) within a transducer assembly;
    (f) combining the signals within the second group; and
    (g) beamforming from the combined signals of the first group with the combined signals of the second group within an imaging system.

6. The method of claim 1 wherein (c) and (d) comprise partial beamforming.

7. The method of claim 1 wherein (d) comprises summing the signals within the first group.

8. The method of claim 1 wherein (b) comprises receiving pulsed signals.

9. The method of claim 1 wherein the sub-array comprises a multi-dimensional array and (a) comprises grouping the elements of the first and second groups as multi-dimensional groupings.

10. The method of claim 1 further comprising:
    (e) including within the first group additional elements from a second sub-array different than and adjacent to the first sub-array.

11. The method of claim 10 further comprising:
    (f) selecting the additional elements as a function of the first steering direction.

12. A method for dynamic sub-array mapping in ultrasound beamformation, the method comprising:

(a) grouping elements of a first sub-array of an array into at least first and second groups, the grouping being configurable, via a plurality of switches coupled to said first sub-array, into different arrangements and being performed as a function of a first steering direction for receive operation;

(b) receiving first pulsed wave signals from the elements of the first group and second pulse wave signals from the elements of the second group;

(c) combining the first pulsed wave signals from the first group of elements; and (d) combining the second pulsed wave signals from second group of elements separate from (c).

13. The method of claim 12 wherein (c) and (d) comprise partially beamforming the first and second pulsed wave signals, respectively;

further comprising:

(e) performing (c) and (d) within a transducer assembly; and (f) beamforming first and second outputs of (c) and (d) within an imaging system.

14. The method of claim 12 further comprising:

(e) grouping elements of a second sub-array of the array into at least second and third groups as a function of the first steering direction;

(f) including at least one element of the second sub-array in the first group of elements.

15. A system for dynamic sub-array mapping in ultrasound beamformation, the system comprising:

an array of elements;

first and second partial beamformers; and a first plurality of switches operable to group elements of a first sub-array of the array into at least first and second groups as a function of a first steering direction, for a receive beam, the first group connected with the first partial beamformer and the second group connected with the second partial beamformer;

wherein the first and second partial beamformers are operable to apply one of different relative delays, different relative phase shifts or combinations thereof to signals from elements within the first and second groups, respectively, and combining the signals from elements within the first and second groups, respectively.

16. The system of claim 15 wherein N partial beamformers including the first and second partial beamformers are connectable with the first sub-array and wherein the plurality of switches comprise a 1-to-N router operable to connect any one of the elements of the first sub-array with any one of the N partial beamformers.

17. The system of claim 16 further comprising:

M additional partial beamformers connectable with a second sub-array; and a second plurality of switches operable to connect any one of the elements of the second sub-array with any one of the M additional partial beamformers.

18. The system of claim 17 wherein the M additional partial beamformers are free of connection with elements of the first sub-array and the N partial beamformers are free of connection with elements of the second sub-array.

19. The system of claim 17 wherein the first sub-array is adjacent to the second sub-array on the array;

further comprising:

a third plurality of switches operable to connect elements of the first sub-array with at least one of third or fourth partial beamformer.

20. The system of claim 15 further comprising:

third and fourth partial beamformers connectable with a second sub-array of the array; and a second plurality of switches operable to group elements of the second sub-array into third and fourth groups as a function of the steering direction, the third group connected with the third partial beamformer and the fourth group connected with the fourth partial beamformer.

21. The system of claim 15 wherein the first partial beamformer comprises:

at least one of a phase rotator or a delay for each of the elements of the first group; and a summer connected with each of the phase rotators or delays.

22. The system of claim 15 further comprising:

a transducer assembly at least in part including the array and the first and second partial beamformers; and p1 an ultrasound imaging system having a receive beamformer having first and second channels connectable with the first and second partial beamformers.

23. The system of claim 15 further comprising:

a controller operable to reconfigure the first plurality of switches as a function of different steering directions, at least one element being in the first group for the first steering direction and in the second group for a second steering direction.

24. The system of claim 15 wherein the sub-array comprises a multi-dimensional array and the first and second groups comprise multi-dimensional groupings of elements.

* * * * *